Feb. 27, 1973  MINEO ISHIKAWA  3,717,934
SIZING DEVICE FOR MEASURING THE DIAMETER OF A
WORKPIECE OF NON-CIRCULAR CROSS-SECTION
Filed Feb. 26, 1971  4 Sheets-Sheet 1

INVENTOR.
MINEO ISHIKAWA,

BY
Berman, Davidson & Berman,
ATTORNEYS.

Feb. 27, 1973   MINEO ISHIKAWA   3,717,934
SIZING DEVICE FOR MEASURING THE DIAMETER OF A
WORKPIECE OF NON-CIRCULAR CROSS-SECTION
Filed Feb. 26, 1971   4 Sheets-Sheet 4

INVENTOR.
MINEO ISHIKAWA,
BY
Berman, Davidson & Berman,
ATTORNEYS

United States Patent Office 3,717,934
Patented Feb. 27, 1973

3,717,934
SIZING DEVICE FOR MEASURING THE DIAMETER OF A WORKPIECE OF NON-CIRCULAR CROSS-SECTION
Mineo Ishikawa, Kariya-shi, Japan, assignor to Toyoda Koki Kabushiki Kaisha, Kariya-shi, Japan
Filed Feb. 26, 1971, Ser. No. 119,213
Claims priority, application Japan, Feb. 26, 1970, 45/16,488
Int. Cl. G01b 5/00
U.S. Cl. 33—147 N    10 Claims

ABSTRACT OF THE DISCLOSURE

A sizing device has a pair of measuring feelers urged into engagement with a rotating workpiece of non-circular cross-section. The feelers are operated by a cam alternately to engage with and disengage from the workpiece for measuring a particular single diameter of the workpiece. The cam is rotated in coordination with the rotation of the workpiece by a synchronous receiver through the synchronous signal generated by a synchronous transmitter in response to the rotation of the workpiece.

BACKGROUND OF THE INVENTION

The present invention relates to sizing devices, and more particularly to a sizing device which measures a workpiece having, in cross-section, a discontinuous surface such as a surface interrupted by a notch or key way.

A rotating workpiece is ground to a final form of circular cross-section in general grinding operation, wherein the diameter of the workpiece is measured by a sizing device which has a pair of measuring feelers maintained in continuous engagement with the workpiece at positions on the workpiece diametrically opposed to each other.

If, however, the workpiece (e.g., a piston for combustion engines, as shown in FIG. 1) has a discontinuous surface, such as a surface interrupted by bores (B) or flat portions (A), or is being ground to a non-circular cross-section form, such as an ellipse having a major diameter (D1) and a minor diameter (D2), the conventional measuring feelers are incapable of either continuously engaging the surface, or indicating the size of a desired single diameter (e.g., major diameter D1) of the workpiece.

SUMMARY OF THE INVENTION

It is, therefore, an object of the present invention to provide a sizing device which is capable of measuring accurately a particular single diameter of a workpiece of non-circular cross-section.

It is another object of the present invention to provide a sizing device with a pair of measuring feelers which are operated alternatively to smoothly engage with and disengage from a workpiece in quick response to the rotation of the workpiece.

It is still another object of the present invention to provide a sizing device with a cam rotated in coordination with the rotation of a workpiece for causing a pair of measuring feelers to engage the workpiece relative to a particular single diameter of the workpiece.

According to the present invention, there is provided, a sizing device for measuring a particular single diameter of a rotating workpiece of non-circular cross-section which comprises a pair of measuring feelers urged into engagement with the workpiece and adapted to be positioned at diametrically opposite positions relative to the workpiece, a sizing head for movably supporting the measuring feelers, and a detector for detecting the relative displacement between the measuring feelers. Furthermore, an operating cam is rotatably mounted on the sizing head for causing the measuring feelers alternately to engage and disengage the peripheral surface of the workpiece. A synchronous motor mounted on the sizing head rotates the operating cam in coordination with the rotation of the workpiece through the agency of a synchronous signal, which is generated by a synchronous transmitter in response to the rotation of the workpiece.

DESCRIPTION OF THE DRAWINGS

The foregoing and other objects of the present invention will become fully apparent from the following description of a preferred embodiment of the present invention with reference to the accompanying drawings in which.

DESCRIPTION OF A PREFERRED EMBODIMENT

Figure 1:
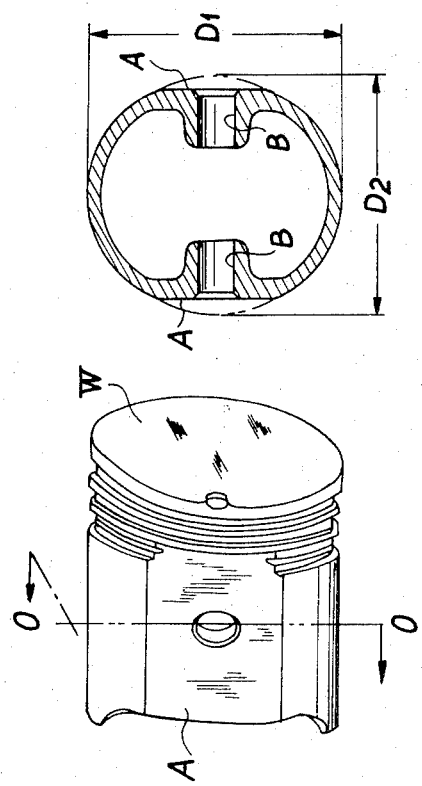
FIG. 1(a) is a perspective view of a piston for combustion engines.
FIG. 1(b) is a cross-sectional view taken along the line 0—0 of FIG. 1(a)
Figure 2:
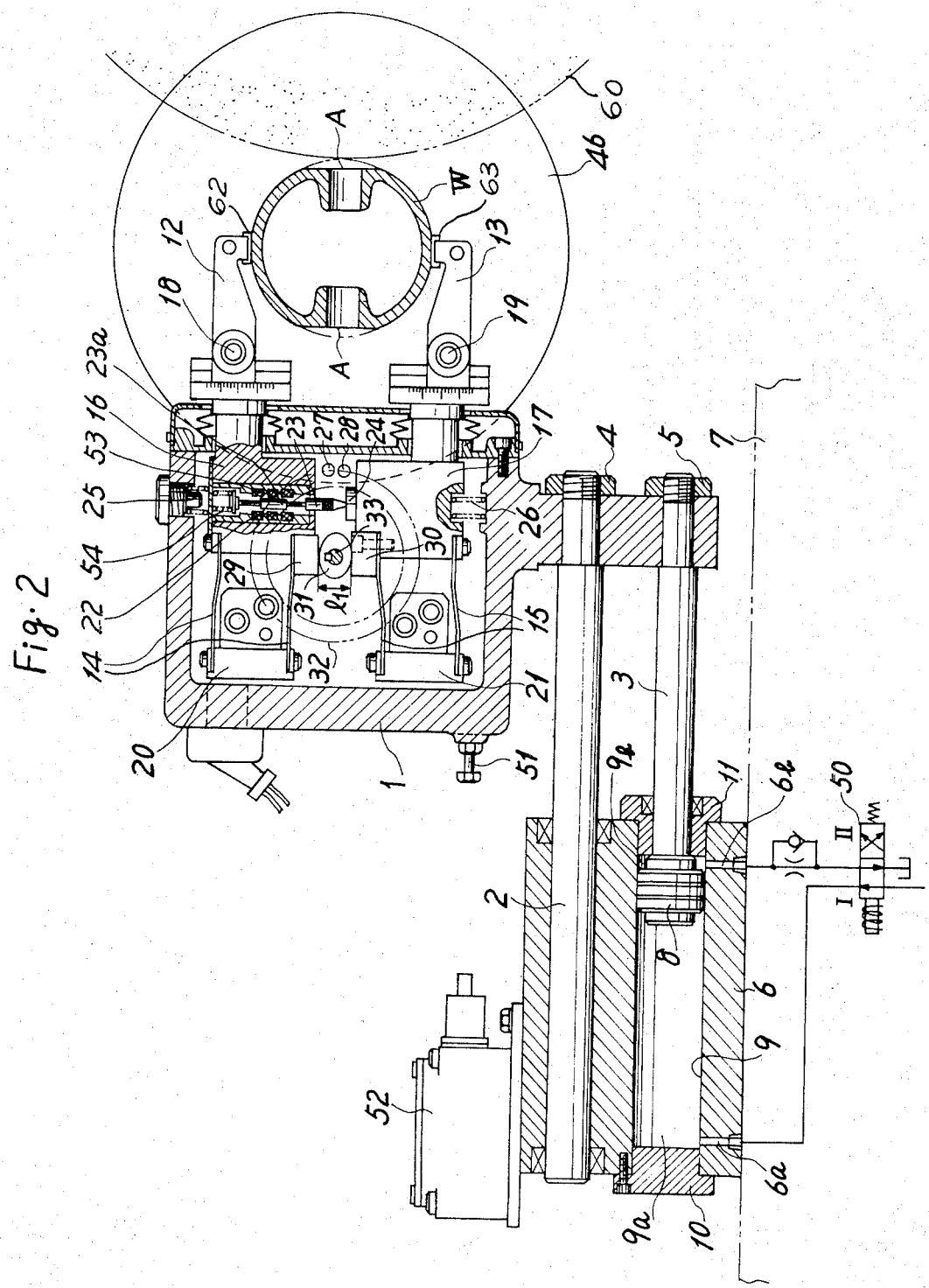
FIG. 2 is a longitudinal sectional view, showing a sizing device according to the present invention.

As shown in FIG. 2, a sizing device according to the present invention comprises a sizing head 1 which has a lower extension secured to a guide bar 2 and to a piston rod 3 by means of nuts 4 and 5. The guide bar 2 is slidably received in a pedestal 6 mounted on a swivel table 7. A piston 8 is slidably received in a hydraulic cylinder 9 formed in the pedestal 6 wherein cylinder chambers 9a and 9b are formed on opposite sides of piston 9 by caps 10 and 11 which are fixed to the pedestal 6. Each chamber is connected to a fluid pressure source (not shown) through a change-over valve 50 for moving the sizing head 1 toward and away from a workpiece W.

A stop 51 is secured to the rear portion of sizing head 1 to operate a limit switch 52 mounted on the pedestal 6. The limit switch 52 is adapted to confirm that the sizing head 1 is at its retracted position.

Figure 3:
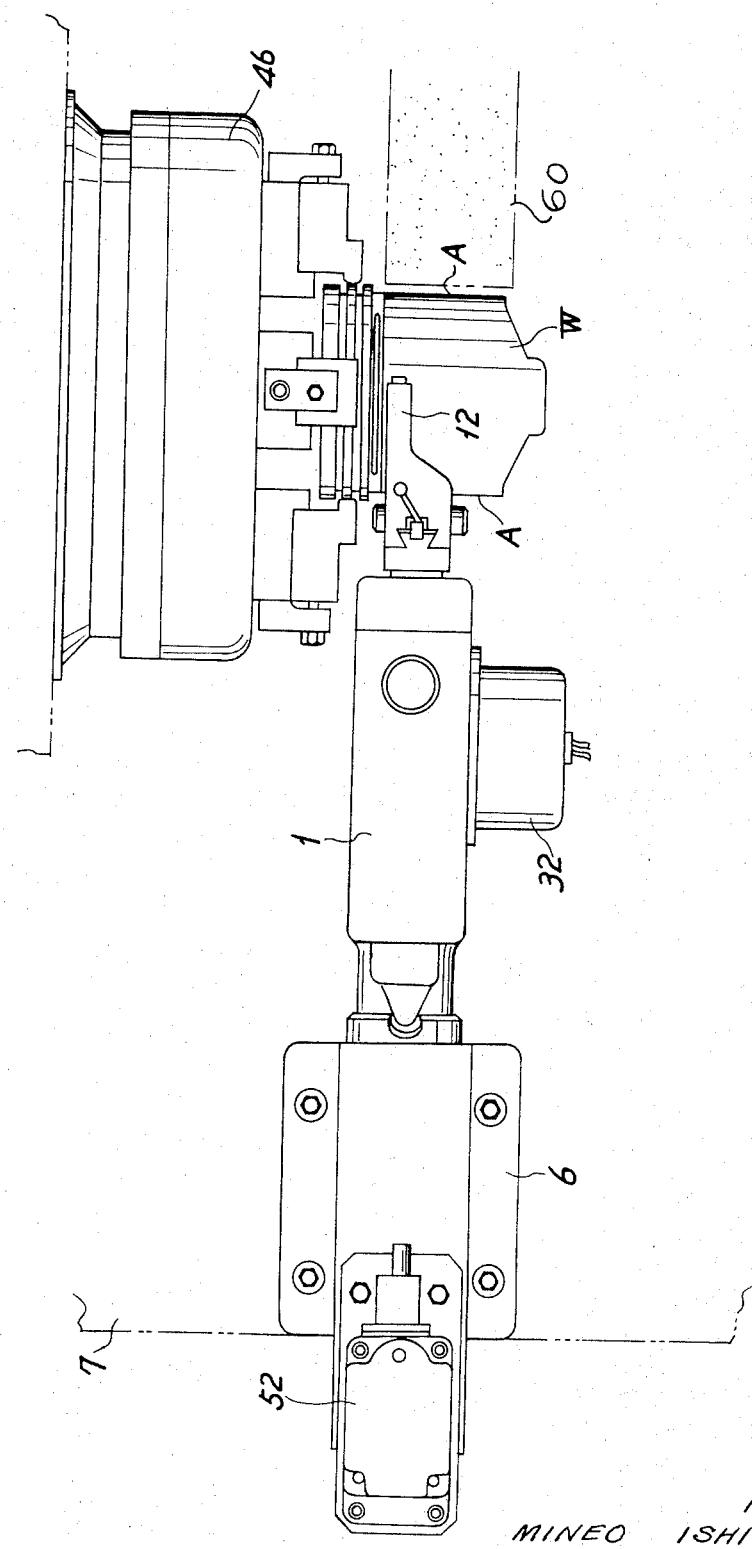
FIG. 3 is a top plan view of the sizing device of FIG. 2.

On the front of sizing head 1 are a pair of measuring feelers 12 and 13 with substantially flat contact elements 62, 63 adapted to engage a workpiece at diametrically opposed positions at the advanced position of sizing head 1. The feelers 12 and 13 are adjustably secured to carriers 16 and 17 by means of nuts 18 and 19, respectively, in a well known manner, such as by dovetail engagement as seen in FIG. 3. The carrier 16 is connected to a bracket 20, which is mounted on the inside wall of the sizing head 1, by means of a pair of flat springs or resilient supports 14, which are parallel to each other, for movably supporting the carrier 16. Each of flat springs 14 has one end secured to the bracket 20 and its other end secured to the carrier 16. Similarly, the carrier 17 is connected to a bracket 21, mounted on the inside wall of the sizing head 1, by means of a pair of flat springs or resilient supports 15, which are parallel to each other, for movably supporting the carrier 17. Each of the flat springs 15 has one end secured to the bracket 21 and its other end secured to the carrier 17. Thus, the measuring feelers 12 and 13 are normally kept parallel to each other by the pairs of parallel springs 14 and 15 even if the distance between them is changed, and the movement of carriers 16 and 17 is vertical only.

A compression spring 25 is mounted between the upper wall of sizing head 1 and the upper surface of carrier 16 to urge the carrier 16 downwardly, while a compression spring 26 is intervened between the lower wall of sizing head 1 and the lower surface of carrier 17 to urge upwardly the carrier 17. Thus, carriers 16 and 17 are normally urged by springs 25 and 26 toward each other so that the pair of measuring feelers 12 and 13 may be maintained in contact with the workpiece at positions on the workpiece diametrically opposed to each other during grinding operation. Furthermore, stop pins 27 and 28 are secured to the sizing head 1 between the lower surface of carrier 16 and the upper surface of carrier 17 to restrain the movement of carriers 16 and 17 towards each other.

Between carriers 16 and 17 there is provided a feeler operating mechanism which comprises a cam follower 29 fixedly mounted on the lower portion of carrier 16, a cam follower 30 fixedly mounted on the upper portion of carrier 17, and an elliptical cam 31 interposed between cam followers 29 and 30. The cam followers 29 and 30 are urged into engagement with the cam 31 by compression springs 25 and 26. The profile of cam 31 has been formed with regard to the peripheral contour of the workpiece so that feelers 12 and 13 may be permitted to engage the workpiece on its portions of major diameter, as shown in FIG. 2, when cam followers 29 and 30 engage the dam 31 at its opposite position of minor diameter L1, and disengage the workpiece on its opposite portions of smaller radial span; that is, at its non-circular portion, when cam 31 rotates and cam followers 29 and 30 contact cam 31 on its opposite portions of major diameter. Since the span between feelers 12 and 13 periodically and easily changes according to the profile of elliptical cam 31, measuring feelers 12 and 13 smoothly come into engagement with the workpiece on its opposite portions of a particular single diameter even if the workpiece is rotated at high speed.

A conventional displacement detector or differential transformer 22 is mounted in the carrier 16 to generate an output signal corresponding to the relative displacement of measuring feelers 12 and 13. A vertical operating rod 23 having a core 23a thereon is movably supported on the carrier 16 by means of a spring 54 within concentrically arranged electrical windings 53 in a well-known manner so that the core 23a electrically cooperates with the energized windings 53. The lower end of operating rod 23 is downwardly urged by the spring 54 into contact with a seat 24 mounted on the upper surface of carrier 17.

Figure 4:
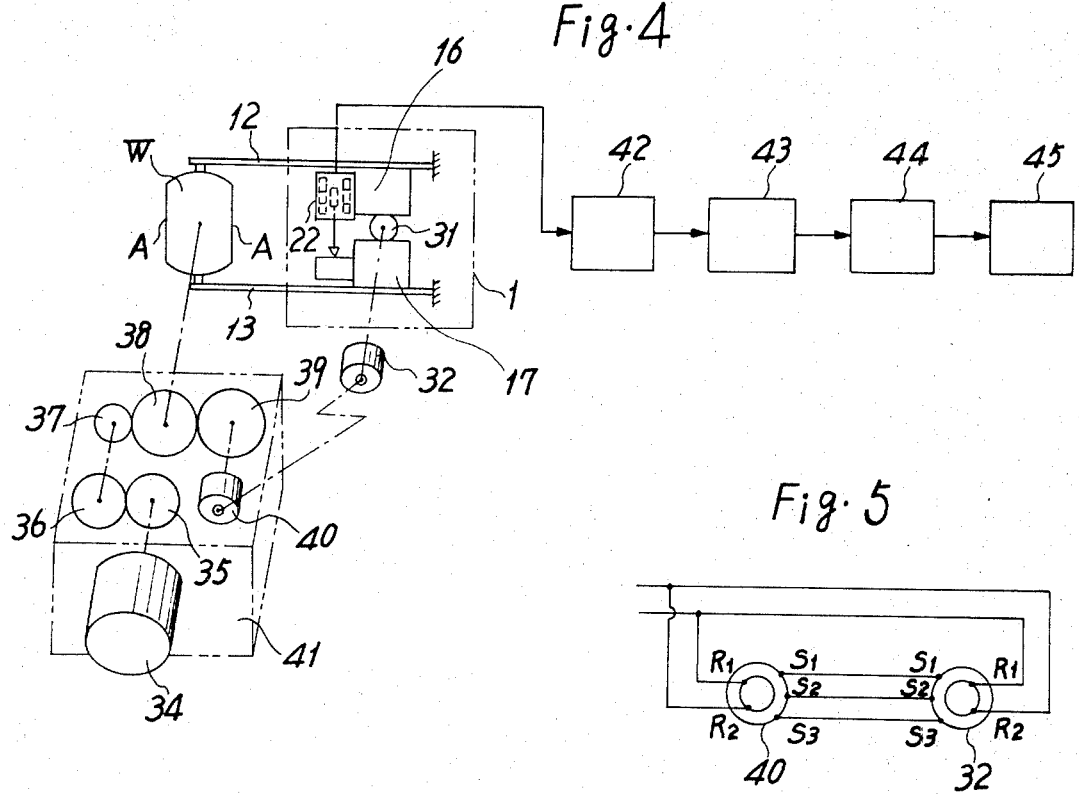
FIG. 4 is a schematic view showing a whole sizing device according to the present invention.

As shown in FIG. 4, the elliptical cam 31 is secured to the shaft of a synchro motor or receiver 32 mounted on the sizing head 1 in such a manner that the minor diameter of cam 31 is parallel to the major diameter of workpiece. The workpiece is carried on a headstock 41 by means of a work-chucking device 46 (FIG. 3) and is rotated by a work-driving motor 34, FIG. 4, through gears 35, 36, 37 and 38 which are rotatably mounted within headstock 41. A synchro motor or synchro transmitter 40, for electrically transmitting the rotated angle of the workpiece, is mounted on the headstock 41 and is operated with the same rotating speed as gear 38 through a gear 39, since gears 38 and 39 have the same teeth number and the same diameter.

Figure 5:
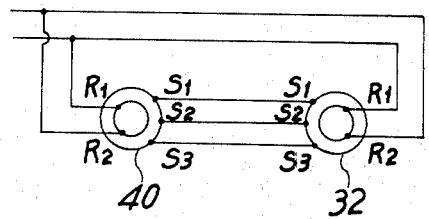
FIG. 5 is a schematic view showing a diagram of synchronous transmitter and receiver.

In FIG. 5, it will be seen that the synchronous motors 40 and 32 have stator terminals S1, S2 and S3 and rotor terminals R1 and R2. The stator and rotor terminals are interconnected to each other in the same phase relationship between the synchronous motors of transmitter 40 and receiver 32. The operation of the synchro system is not described in detail since such systems are well known to those skilled in the art and, for present purposes, suffice it to say that the cam 31 is rotated by the synchronous receiver 32, in the same rotation angle as that of workpiece W, to alternately spread and release the carriers 16 and 17.

Figure 6:
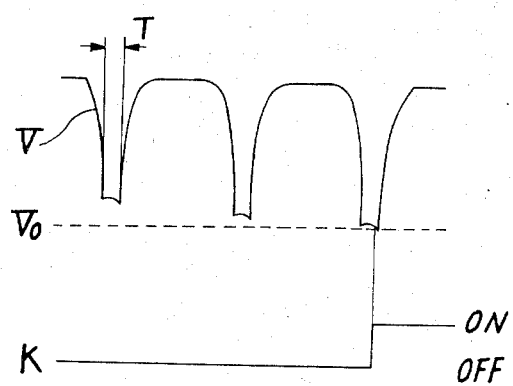
FIG. 6 is a schematic graph showing the relationship between an output signal from a sizing device and a sizing control signal.

As shown in FIG. 4, the output signal from the displacement detector 22 is applied to an amplifier 42, a rectifier 43, and then to a Schmitt trigger circuit 44, which compares the output signal voltage from the rectifier 43 with the preset predetermined voltage thereof. When the output signal voltage V exceeds the preset predetermined voltage level Vo in the Schmitt circuit 44, as shown in FIG. 6, a pulse signal is generated to indicate a sizing point. This pulse signal is transmitted to a main control circuit 45 for controlling feed rates of a wheelhead (not shown) which rotatably supports a grinding wheel 60. A further description of abovementioned circuits 42, 43, and 44 will not be given since such circuits are well known to those skilled in the art but such circuits are as contained in a conventional size indicator manufactured by Tokyo Seimitsu Ltd., of Tokyo, Japan, and sold as Delta Model E–MD–P35C–2P. Circuit 45 is also well known to those skilled in the art and is usually contained in a conventional control device for a grinding machine.

The operation of the sizing device will be described hereunder. Before a sizing operation, the cam 31 having the cam profile suitable to the workpiece is attached to the output shaft 33 of a synchronous motor 32 in such a relationship that the minor axis of the elliptical cam 31 is parallel to the major axis of the workpiece, as shown in FIG. 2.

The change-over valve 50 is shifted to port I by a command from main control circuit 45 to permit fluid under pressure to enter the left chamber 9a, and act against piston 8 to advance the sizing head 1 toward the workpiece W and into sizing position where the measuring feelers 12 and 13 are brought into contact with the workpiece to measure the major diameter of the workpiece, as shown in FIG. 2. The synchronous transmitter 40, driven by workpiece motor 34, generates an output signal corresponding to the rotation angle of the workpiece, and such signal is electrically transmitted to the receiver 32 for rotating the cam 31 synchronously with the workpiece. Therefore, measuring feelers 12 and 13 are permitted to contact the workpiece at its major diameter and are prevented from contacting the discontinuous surfaces A of workpiece W. While feelers 12 and 13 are in contact with the rotating workpiece being ground, the detector 22 generates an output signal, the voltage level of which decreases toward the preset predetermined voltage level as the grinding operation progresses. The Schmitt circuit 44 provides a pulse signal with the main control circuit 45 wherein a hold circuit (not shown) converts the pulse signal to an output signal K (FIG. 6) for generating a sizing control signal. The sizing control signal energizes a relay, not shown, for controlling the feed movement of the wheel head to stop the feed and then move the wheel head to its retracted position after sparkout operation. Simultaneously, the change-over valve 50 is shifted to position II to permit fluid under pressure to enter the right chamber 9b and act against piston 8 to move the sizing head 1 rearwardly until the retraction thereof is confirmed by the limit switch 52.

Moreover, when the time span T of measuring signal V, which is formed during the contact of feelers 12 and 13 with the workpiece, is shorter, the measuring accuracy of major diameter is higher. The time span is adjusted by a change of the cam profile.

What is claimed is:

1. A sizing device for measuring a particular diameter of a rotating substantially circular workpiece having predetermined discontinuous surface areas and mounted on a rotatable workpiece support, said device comprising a sizing head, means for mounting said device relative to said support, means mounting a pair of opposed spaced measuring feelers on said head for movement toward and away from each other, means on said head to urge said feelers toward each other, feeler spreading means on said head to move said feelers away from each other, a synchronous transmitter adapted to generate a synchronous signal in response to the rotation of said workpiece support, a synchronous receiver for said signal connected to said feeler spreading means for synchronizing the operation of said feeler spreading means and said workpiece support to move said feelers away from each other when said feelers are adjacent a pre-selected portion of said discontinuous surface areas, and means for detecting the relative movement of said feelers with respect to each other.

2. A sizing device according to claim 1, wherein said detecting means is connected to one of said feelers.

3. A sizing device according to claim 1, wherein said means to urge said feelers toward each other is spring means.

4. A sizing device according to claim 1, wherein said means for mounting said feelers include a pair of spaced parallel resilient supports for each of said feelers which are mounted at one pair of ends on said head and at the other pair of ends on the corresponding feeler.

5. A sizing device according to claim 1, wherein each of said feelers has a substantially flat workpiece contact element and said elements are maintained in parallel relationship throughout the movement of said feelers.

6. A sizing device according to claim 1, wherein said feeler spreading means includes a cam.

7. A sizing device according to claim 6, and a cam follower connected to each of said feelers with said cam located between said cam followers.

8. A sizing device according to claim 6 wherein said cam and workpiece are substantially elliptical in shape with the major axis of said cam substantially perpendicular to the minor axis of said workpiece.

9. A sizing device according to claim 1, wherein said detecting means is a differential transformer.

10. A sizing device according to claim 1 wherein said feeler spreading means includes a cam and at least one cooperating cam follower, said cam having a shape correlated to the shape of said workpiece whereby the cam follower is actuated when said feelers are adjacent a preselected portion of said discontinuous surface areas.

References Cited
UNITED STATES PATENTS

| | | | |
|---|---|---|---|
| 2,323,647 | 7/1943 | Colson | 33—147 L |
| 3,065,415 | 11/1962 | Slamar | 33—147 L |
| 2,836,898 | 6/1958 | Possati | 33—147 N |

LEONARD FORMAN, Primary Examiner

P. G. FOLDES, Assistant Examiner

U.S. Cl. X.R.

33—178 E, 174 L